(12) United States Patent
Bryon et al.

(10) Patent No.: US 10,656,356 B2
(45) Date of Patent: May 19, 2020

(54) SEALING ENCLOSURE ARRANGEMENTS FOR OPTICAL FIBER CABLES

(71) Applicant: COMMSCOPE CONNECTIVITY BELGIUM BVBA, Kessel-Lo (BE)

(72) Inventors: Roel Modest Willy Bryon, Aarschot (BE); Danny Willy August Verheyden, Gelrode (BE); Kristof Vastmans, Boutersem (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/306,829

(22) PCT Filed: Jun. 1, 2017

(86) PCT No.: PCT/EP2017/063407
§ 371 (c)(1),
(2) Date: Dec. 3, 2018

(87) PCT Pub. No.: WO2017/207740
PCT Pub. Date: Dec. 7, 2017

(65) Prior Publication Data
US 2019/0293888 A1    Sep. 26, 2019

Related U.S. Application Data

(60) Provisional application No. 62/345,324, filed on Jun. 3, 2016.

(51) Int. Cl.
G02B 6/44 (2006.01)
H02G 15/013 (2006.01)
H02G 15/113 (2006.01)

(52) U.S. Cl.
CPC ......... *G02B 6/4444* (2013.01); *G02B 6/4446* (2013.01); *H02G 15/013* (2013.01); *H02G 15/113* (2013.01)

(58) Field of Classification Search
CPC .. G02B 6/4444; G02B 6/4446; H02G 15/013; H02G 15/113
See application file for complete search history.

(56) References Cited

U.S. PATENT DOCUMENTS 5,631,993 A * 5/1997 Cloud .................. G02B 6/4446
385/135
5,844,171 A 12/1998 Fitzgerald
(Continued)

FOREIGN PATENT DOCUMENTS

JP    2005-304104 A    10/2005

OTHER PUBLICATIONS

International Search Report and Written Opinion of the International Searching Authority for International Patent Application No. PCT/EP2017/063407 dated Sep. 4, 2017, 12 pages.

*Primary Examiner* — Ryan A Lepisto
*Assistant Examiner* — Erin D Chiem
(74) *Attorney, Agent, or Firm* — Merchant & Gould P.C.

(57) ABSTRACT

Aspects and techniques of the present disclosure relate to an enclosure arrangement that provides a seal useful for sealing optical fiber cables. The enclosure arrangement can include a housing with two shell members that fit together to define a cable passage. The two shell members can include circumferential sealing ribs and longitudinal sealing ribs that each has a rounded profile. A sealant material can be used to wrap the optical fiber cable. When the housing is compressed into contact with the sealant material, the circumferential and longitudinal sealing ribs can apply a uniform, controlled pressure about the optical fiber cable without puncturing or damaging the sealant material.

15 Claims, 9 Drawing Sheets

(56) References Cited

U.S. PATENT DOCUMENTS

| | | | |
|---|---|---|---|
| 2005/0271344 A1* | 12/2005 | Grubish | ................ G02B 6/445 385/135 |
| 2008/0142243 A1 | 6/2008 | Bird et al. | |
| 2012/0090876 A1 | 4/2012 | Dower et al. | |
| 2014/0050452 A1 | 2/2014 | Badura et al. | |

* cited by examiner

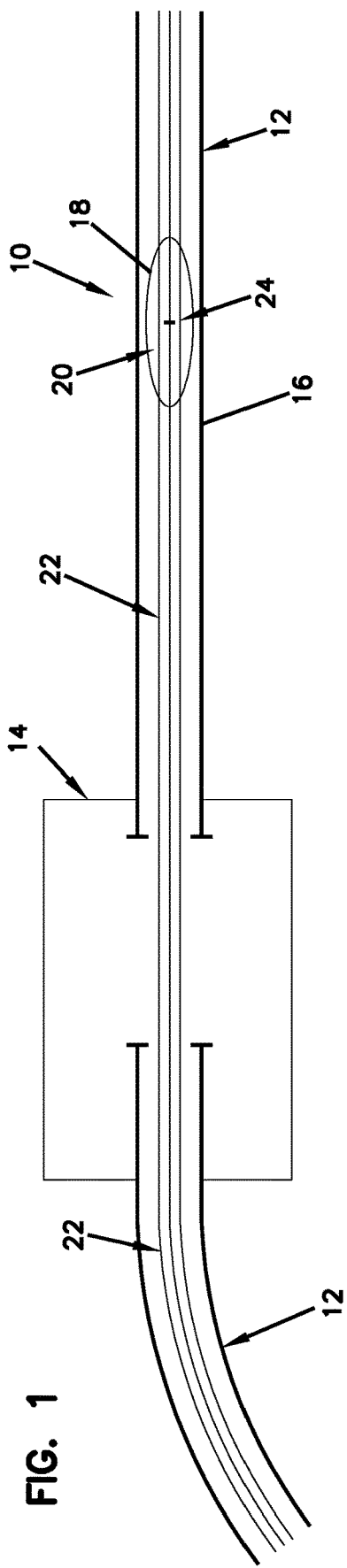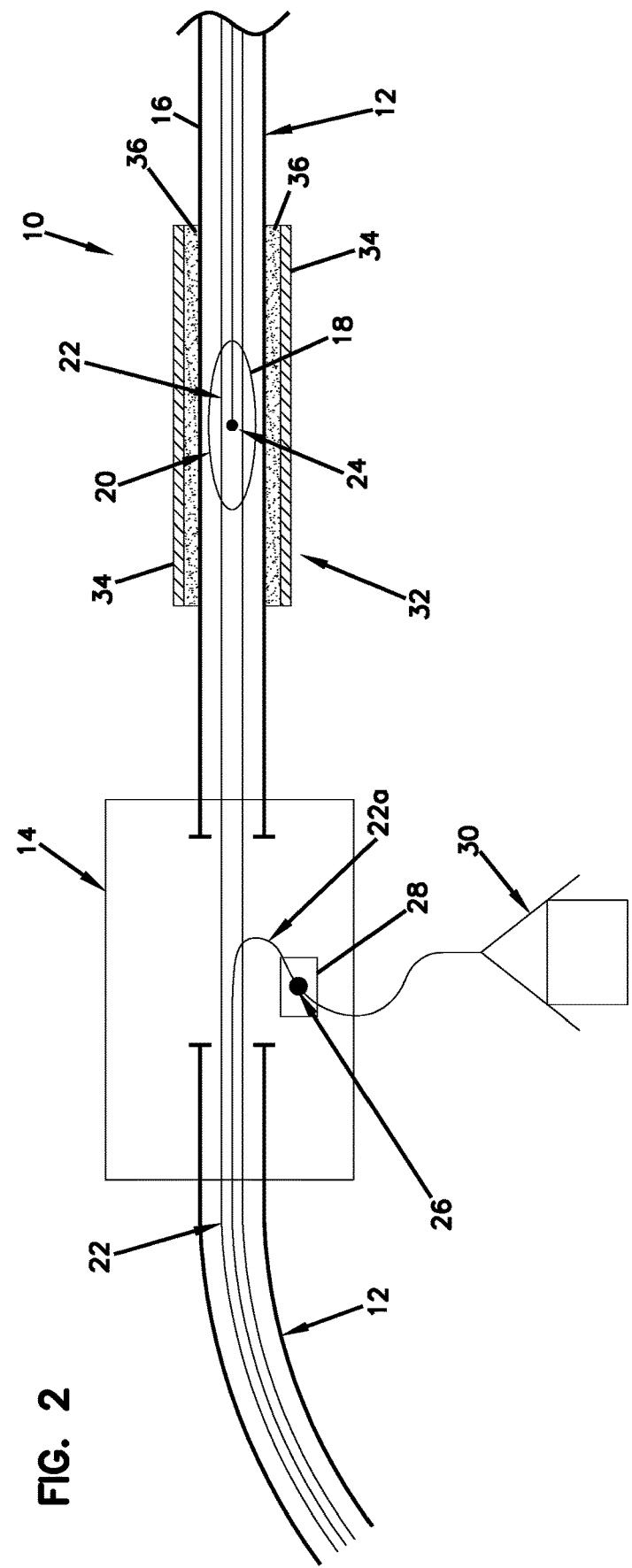

SEALING ENCLOSURE ARRANGEMENTS FOR OPTICAL FIBER CABLES

CROSS-REFERENCE TO RELATED APPLICATION

This application is a National Stage of PCT/EP2017/063407, filed on Jun. 1, 2017, which claims the benefit of U.S. patent application Ser. No. 62/345,324, filed on Jun. 3, 2016, the disclosures of which are incorporated herein by reference in their entireties. To the extent appropriate, a claim of priority is made to each of the above disclosed applications.

TECHNICAL FIELD

The present disclosure relates generally to enclosure arrangements used for sealing exposed optical fiber cables.

BACKGROUND

Fiber optic telecommunications technology is becoming more prevalent as service providers strive to deliver higher bandwidth communication capabilities to customers/subscribers. As data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on. These networks are often referred to as fiber to the premise (FTTP) or fiber to the home (FTTH) networks. In an FTTH network, fiber optic cable is run from the service provider's central office to an ONT located at the subscriber's residence or office space.

Improvements in telecommunications enclosures to protect the exposed interior of fiber optic cables are desirable.

SUMMARY

Features of the present disclosure relate to an enclosure arrangement that provides a seal useful for sealing optical fiber cables. The enclosure arrangement can include a housing with two shell members that fit together to define a cable passage. The two shell members can include circumferential sealing ribs and longitudinal sealing ribs that each has a rounded profile. The enclosure arrangement can further include a sealant material can be used to wrap the optical fiber cable. When the housing is compressed into contact with the sealant material, the circumferential and longitudinal sealing ribs can apply a uniform, controlled pressure about the optical fiber cable without puncturing or damaging the sealant material.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1 is a schematic representation of a fiber optic network including a cable passing through an optical termination enclosure, the cable having an incision in accord with principles of the present disclosure.

FIG. 2 is a schematic representation of the fiber optic network shown in FIG. 1 with an optical fiber retracted from the cable and an enclosure arrangement positioned over the incision in accord with the principles of the present disclosure.

DETAILED DESCRIPTION

Figure 3:
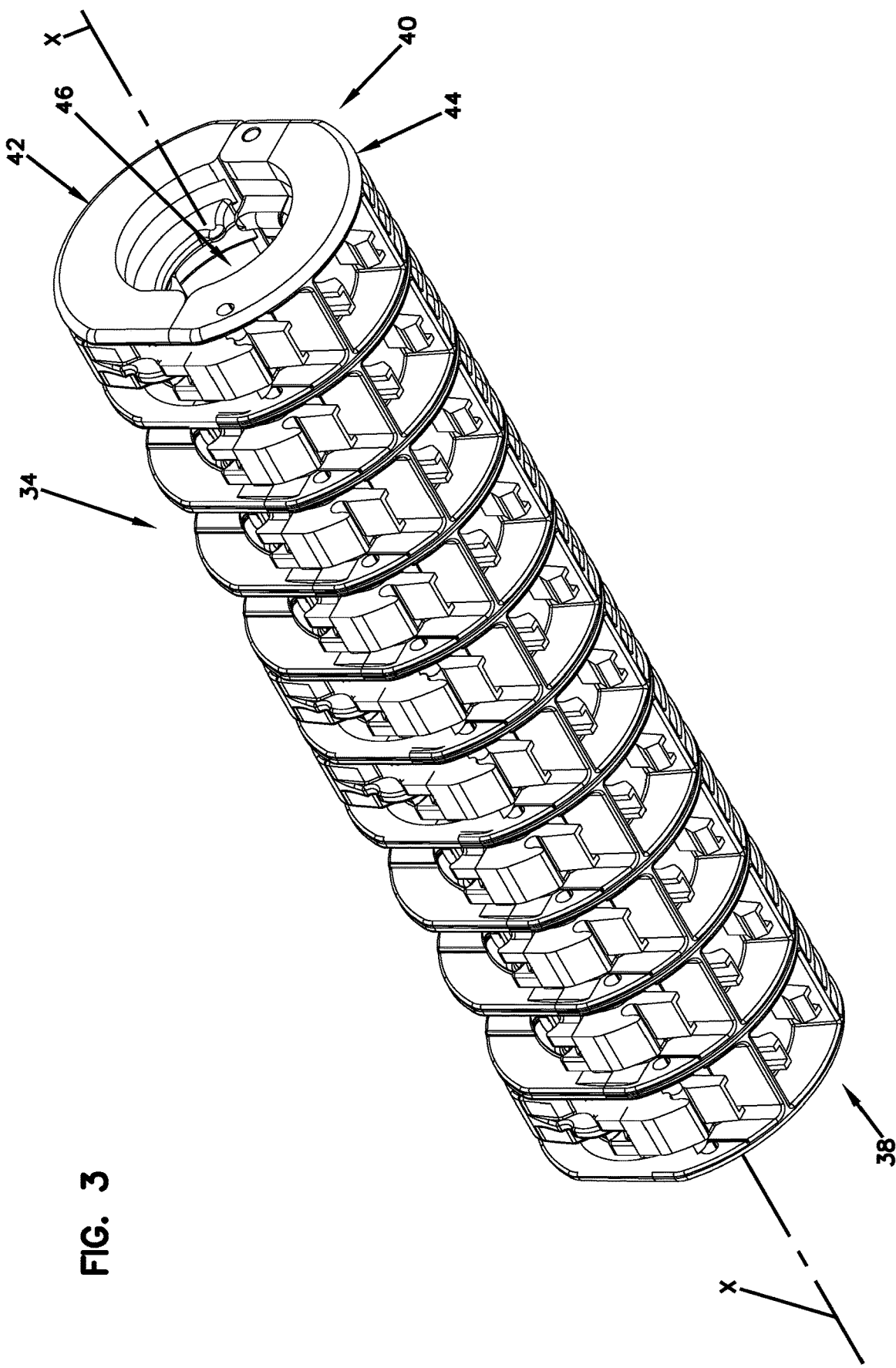
FIG. 3 is a perspective end view depicting a housing of the enclosure arrangement in a closed orientation in accord with the principles of the present disclosure.

A feature of the present disclosure relates to an enclosure arrangement for resealing an opening in an optical cable.

FIGS. 1 and 2 illustrate a fiber optic network 10 in accordance with the principles of the present disclosure. In such an embodiment, a telecommunications cable 12 (e.g., a single fiber or multi-fiber distribution cable) is shown passing through an example optical termination enclosure (OTE) 14. The telecommunications cable 12 may have on the order of 12 to 48 fibers; however, alternative implementations may include fewer or more fibers. While telecommunications cables typically have a large number of fibers, the various aspects of the present disclosure are also applicable to distribution cables having fewer numbers of fibers (e.g., 2 or more fibers). For example, the telecommunications cable 12 can include an outer jacket 16 enclosing a single buffer tube and at least two strength members extending on opposite sides of the single buffer tube. An outer strength member such as Kevlar can surround the single buffer tube within the jacket. The single buffer tube can enclose loose fibers or ribbon fibers.

An incision 18 (e.g., cut) can be made in the outer jacket 16 of the telecommunications cable 12 such that a portion of the outer jacket 16 may be removed from the telecommunications cable 12 that is outside the OTE 14 to provide a window 20 (e.g., opening) that exposes optical fibers 22. One or more of the optical fibers 22 of the telecommunications cable 12 may be cut at a location 24. The cut optical fiber 22a may be retracted out of the telecommunications cable 12 while the remaining optical fibers 22 of the telecommunications cable 12 are uncut and continue to pass through. The cut optical fiber 22a can be routed to the OTE 14 and spliced at a splice location 26 within splice tray 28 for facilitating coupling of the cut optical fiber 22a to a subscriber location 30. In other examples, the cut optical fiber 22a can be routed directly to the subscriber location 30 and spliced there rather than within the OTE 14.

Field splices are typically housed within sealed splice enclosures. As depicted, an enclosure arrangement 32 (see FIG. 2) in accordance with the principles of the present disclosure is shown positioned over the window 20 located in the telecommunications cable 12 to provide protection. The distance between the OTE 14 and the enclosure arrangement 32 can be from about 2 meters up to about 100 meters. The distance can vary with the length of the telecommunications cable 12 and the required distance to be routed. The distance can also depend on the path of travel whether it is a straight path or a path with many turns. The location of the incision or cut will also be a factor in addition to the friction of the cable.

The enclosure arrangement 32 can include a housing 34 (e.g., a shell). The enclosure arrangement 32 can further include a sealant material 36 can be layer of material (e.g., gel material or gel sealant) that is arranged and configured to be disposed over the window 20 to assist in sealing against the surface of the outer jacket 16. The sealant material 36 can be a flexible sealant sheet or sleeve that is configured to be wrapped around the outer jacket 16 of the telecommunications cable 12 to provide a longitudinal overlap thereon, although alternatives are possible. For example, the sealant material 36 can be wrapped multiple times around the telecommunications cable 12 in a cigarette wrap-type having a longitudinal seam. In other examples, the sealant material 36 can be a suitable material that provides a seal, such as mastics or other polymeric film. The enclosure arrangement 32 can be configured to protect internal components against rain, wind, dust, rodents and other contaminants. The enclosure arrangement 32 is illustrated and described in more detail with reference to FIGS. 3-10.

Referring to FIG. 3, a perspective end view of the example housing 34 is depicted in accord with the present disclosure. The housing 34 has a first end 38 and an opposite second end 40. The example housing 34 can include a first longitudinally extending piece 42 and a second longitudinally extending piece 44 that cooperate (e.g., mate) to define an optical cable passage 46 (e.g., interior) that extends from the first end 38 to the second end 40 of the housing 34. The housing 34 further defines a longitudinal axis X that extends between the first and second ends 38, 40.

In one example, the housing 34 may be formed from any suitable material with plastic being a desirable material. The housing 34 may be made from a variety of materials, such as polypropylene. It will be appreciated that the housing 34 can be made from metals, plastics, ceramics, acrylics, rubber, combinations thereof, or any other solid material.

In certain examples, the first and second longitudinally extending pieces 42, 44 can be constructed as identical pieces, although alternatives are possible. The first and second longitudinally extending pieces 42, 44 can be semi-cylindrical in shape such that the example housing 34 has a cylindrical shape when the first and second longitudinally extending pieces 42, 44 are mated, although alternatives are possible.

Figure 4:
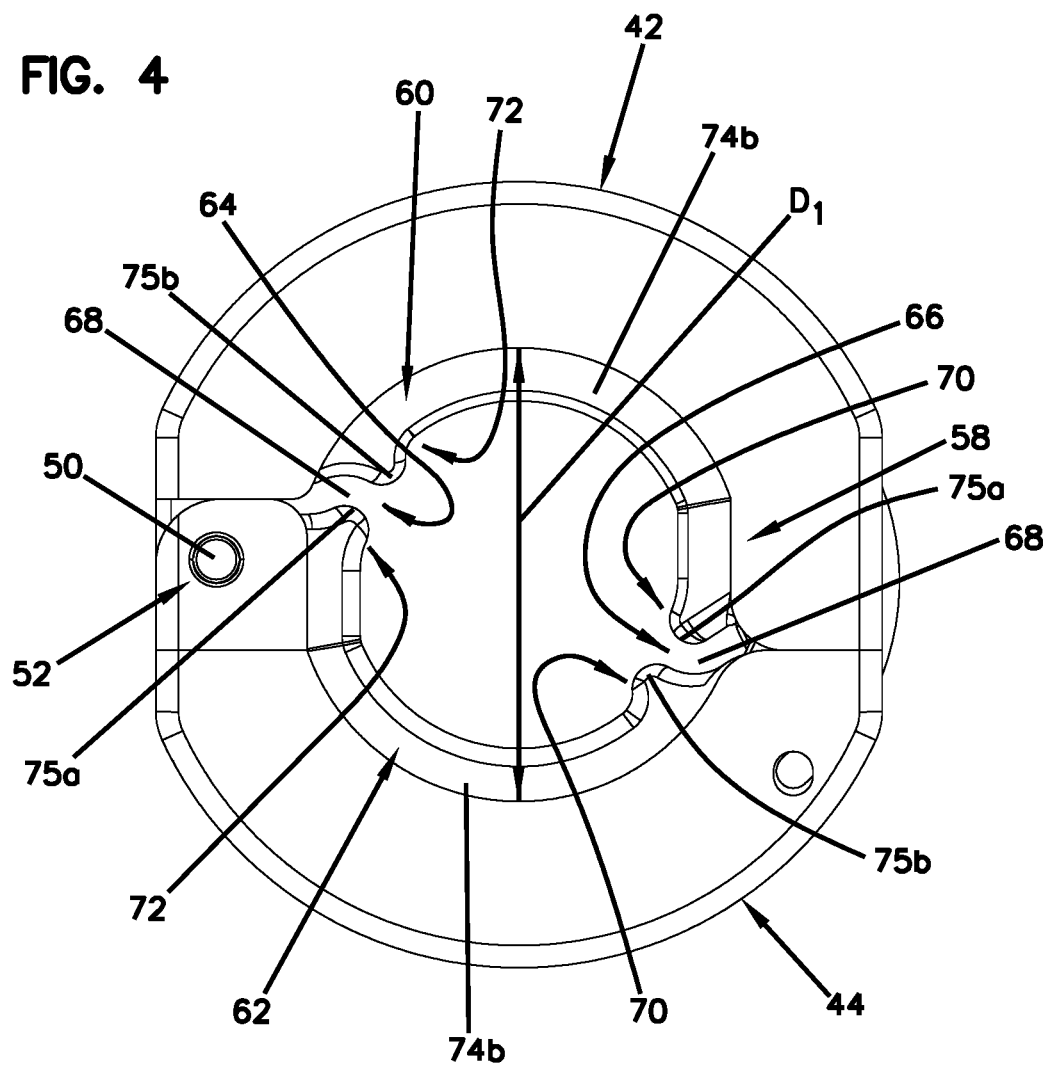
FIG. 4 is an end view of the housing shown in FIG. 3 depicting circumferential sealing ribs in accord with the principles of the present disclosure.

Referring to FIG. 4, an end view of the housing 34 is shown. The first and second longitudinally extending pieces 42, 44 each define semi-circular recesses for the passage of the telecommunications cable 12. For example, when the first and second longitudinally extending pieces 42, 44 are mated together, the first and second ends 38, 40 of the housing 34 can each define recesses 48 (e.g., openings) that have a first cross-dimension $D_1$ for receiving the telecommunications cable 12.

In certain examples, the first and second longitudinally extending pieces 42, 44 can be pivotally connected by a hinge pin 50 to pivot about pivot point 52. The hinge pin 50 can be one long hinge attached between one side of each as shown, or can be a pair of short hinges attached to each side (not shown). In other examples, the first and second longitudinally extending pieces 42, 44 can be attached together by a snap-fit connection, although alternatives are possible. For example, the first and second longitudinally extending pieces 42, 44 can be attached via at least one of a friction fit, a latch fit, a sliding fit, a fastener, and/or a screw. Alternatively, the first and second longitudinally extending pieces 42, 44 can be joined by other fasteners (e.g., bolts or other fastening elements) spaced about a periphery of the housing 34. The first and second longitudinally extending pieces 42, 44 can extend along the longitudinal axis X so as to extend generally from the first end 38 to the second end 40 of the housing 34.

Figure 5:
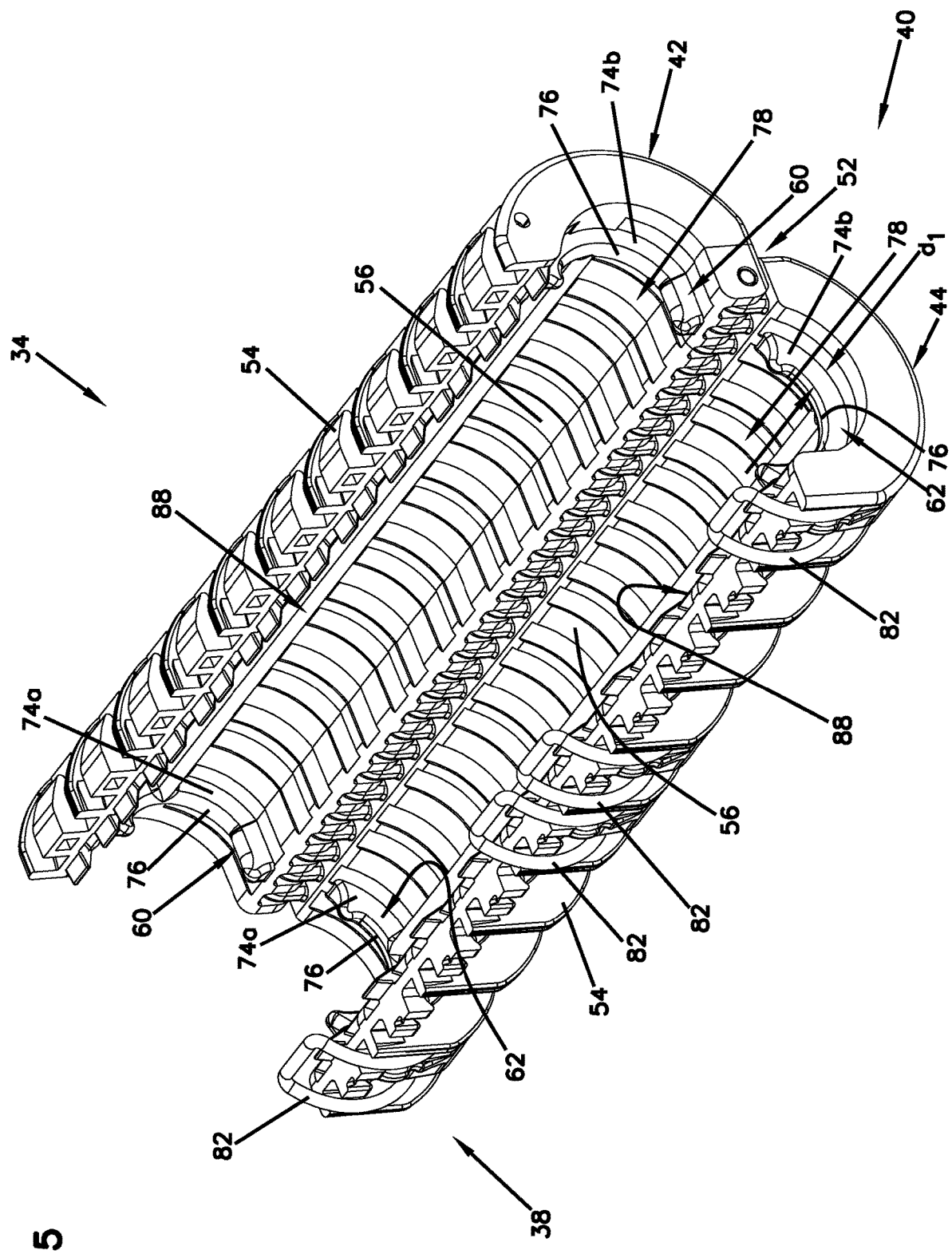
FIG. 5 is a perspective view of the housing shown in FIG. 3 in an open orientation depicting longitudinal sealing ribs.

The first and second longitudinally extending pieces 42, 44 of the example housing 34 can each include an outer wall surface 54 (see FIG. 5) and an inner wall surface 56 (see FIG. 5). The inner wall surface 56 can form a boundary of the optical cable passage 46 of the housing 34. The housing 34 can further include a circumferential sealing rib 58 (see FIG. 4) adjacent each of the first and second ends 38, 40 to provide a radial seal. The circumferential sealing ribs 58 can be arranged and configured to block water from entering axially through the sealant material 36 at the first and second ends 38, 40 of the housing 34. The circumferential sealing rib 58 can include a first segment 60 defined by the first longitudinally extending piece 42 and a second segment 62 defined by the second longitudinally extending piece 44. The first and second segments 60, 62 of the circumferential sealing rib 58 can respectively extend radially outwardly from the inner wall surface 56 of the first and second longitudinally extending pieces 42, 44 toward the longitudinal axis X to provide a radial seal. The first and second segments 60, 62 of the circumferential sealing rib 58 may be integrally formed as one single piece with the first and second longitudinally extending pieces 42, 44 of the housing 34, although alternatives are possible. The first and second segments 60, 62 can be made with a plastic material, such as, but not limited to a polypropylene.

When the first and second longitudinally extending pieces 42, 44 are mated together, the first and second segments 60, 62 of each circumferential sealing rib 58 define first and second interface locations 64, 66. A contoured rounded gap 68 is formed at the first and second interface locations 64, 66 between the first and second segments 60, 62 of the circumferential sealing rib 58.

Figure 6:
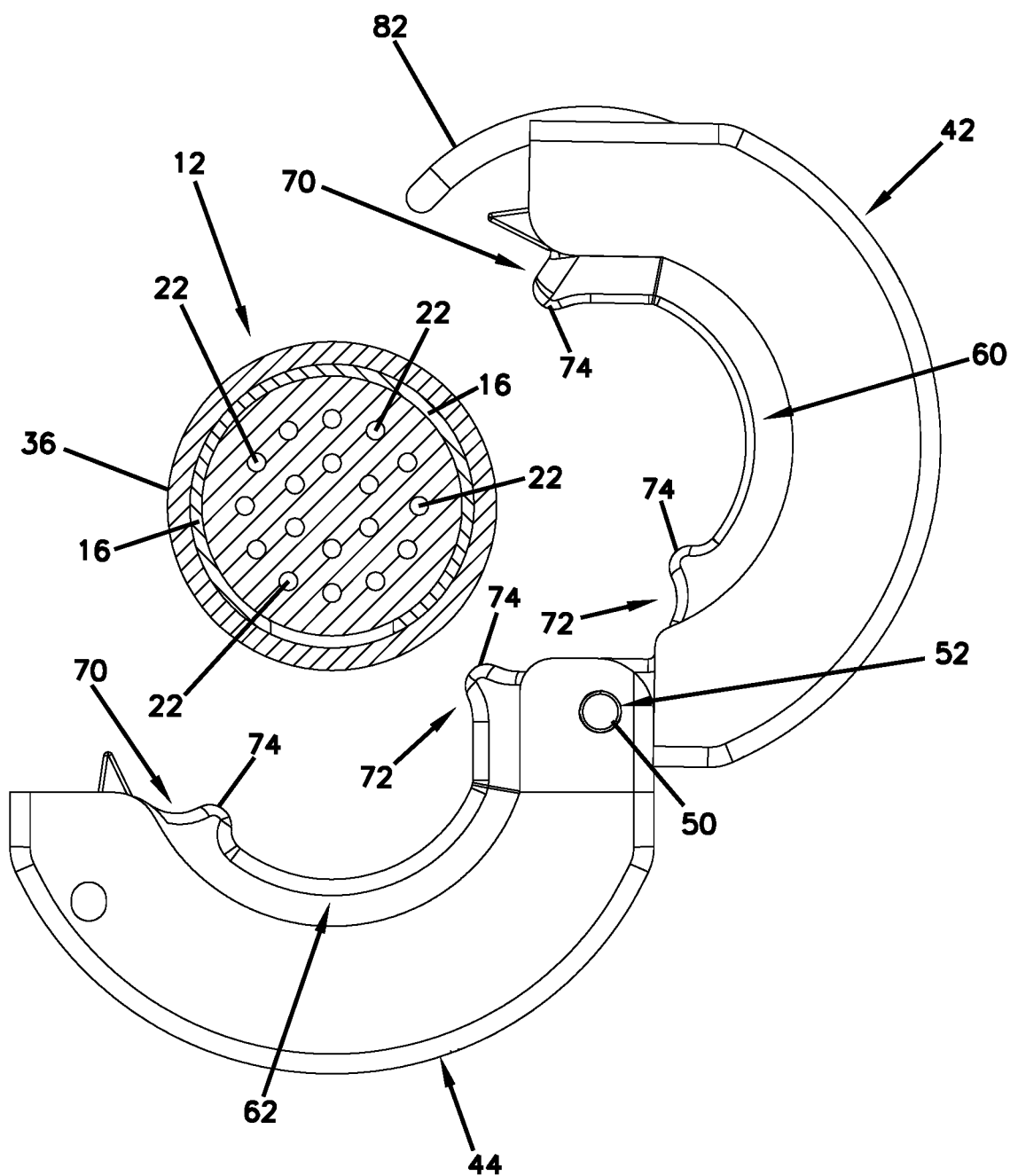
FIG. 6 is an end view of the housing in an open orientation showing a cable configured to be enclosed in the housing in accord with the principles of the present disclosure.

Referring to FIG. 6, the telecommunications cable 12 is shown with the sealant material 36 wrapped around the outer jacket 16 to provide a longitudinal seal. The sealant material 36 can be wrapped around the outer jacket 16 two to three times. The thickness of the sealant material 36 can be about 2 cm once applied, although alternatives are possible. The telecommunications cable 12 can have an outer diameter of about 16 mm, although alternatives are possible. With the sealant material 36 wrapped around the telecommunications cable 12, the outer diameter of the telecommunications cable 12 can increase to be about 20 mm, although alternatives are possible. For example, it will be appreciated that other thicknesses and configurations may be possible that will change the overall diameter of the telecommunications cable 12.

In certain examples, the housing 34 can have an outer diameter that ranges between 20 mm (millimeters) to 50 mm, although variations are possible. Typically the housing 34 can have an outer diameter of at least 35 mm, although variations are possible. Often, the housing 34 can have a diameter of at least 35 mm, although variations are possible. Usually, the housing 34 can have a diameter of no more than 60 mm, although variations are possible. In still other examples, the housing 34 can have a diameter that is closer to the diameter of the telecommunications cable 12, although alternatives are possible. For example, the outer diameter of the housing 34 can have a diameter not more than 30 mm larger than the cable outer diameter.

The telecommunications cable 12 is adapted to be received within the optical cable passage 46 of the housing 34. The design helps to provide a seal completely around the telecommunication cable 12 as well as to help ensure exclusion of leak paths. Unlike conventional enclosures, the enclosure arrangement 36 does not include teeth or knife like edges that can engage and bite into (e.g., puncture) the sealant material 36 when in a sealed, closed orientation. For example, the contoured rounded gap 68 is arranged and configured for pressurizing and sealing about the telecommunications cable 12 without puncturing the sealant material 36.

Turning again to FIG. 4, the first and second segments 60, 62 of the circumferential sealing rib 58 adjacent the first and second ends 38, 40 of the housing 34 can each have a first end 70 and an opposing second end 72. In the example depicted, the second end 72 of the first and second segments 60, 62 is positioned adjacent the hinge pin 50.

The first and second segments 60, 62 each include inner and outer major surfaces 74a, 74b (see FIG. 5) and a minor surface 76 (see FIG. 5) extending between the inner and outer major surfaces 74a, 74b. The inner and outer major surfaces 74a, 74b and the minor surface 76 can extend from the first end 70 to the second end 72 of the first and second segments 60, 62.

The first end 70 and the second end 72 of the first and second segments 60, 62 of the circumferential sealing rib 58 can each have first and second projections 75a, 75b that extend from the minor surface 76 thereof. The first projection 75a that extends from the minor surface 76 of the first segment 60 at the first end 70 has a different shape than the second projection 75b that extends from the minor surface 76 of the first segment 60 at the second end 72. The first projection 75a that extends from the minor surface 76 of the second segment 62 at the second end 72 has a different shape than the second projection 75b that extends from the minor surface 76 of the second segment 62 at the first end 70.

When the first and second longitudinally extending pieces 42, 44 of the housing 34 are mated, the first and second segments 60, 62 are connected in a closed position to form the circumferential sealing rib 58. While in the closed position, the first and second projections 75a, 75b can extend in a direction toward the interface locations 64, 66 defined by the first and second segments 60, 62 of the circumferential sealing rib 58. The first projection 75a of the first segment 60 opposes the second projection 75b of the second segment 62 and the second projection 75b of the first segment 60 opposes the first projection 75a of the second segment 62. For example, the first projections 75a of the first and second segments 60, 62 oppose the second projections 75b of the first and second segments 60, 62.

The first projection 75a can protrude further into the interface locations 64, 66, while the second projection 75b can have less of a protrusion and more curvature (e.g., bump) to slightly minor the shape of the first projection 75a and not directly oppose the first projection 75a, although alternatives are possible. The first projection 75a can have rounded surfaces that project outwardly toward the optical cable passage 46 when the housing 34 is in the closed orientation (see FIGS. 3-4). For example, the first projection 75a can be generally arcuate or curved in shape, which can help to provide the contoured rounded gap 68 between the first and second segments 60, 62 when the housing 34 is in the closed orientation. The first and second projections 75a, 75b of the first and second segments 60, 62 can have different shapes that are not directly opposed to help control the pressure at the interface locations 64, 66 and create a labyrinth seal when the housing 34 is closed over the telecommunications cable 12. In the example depicted, the first and second projections 75a, 75b are not symmetrically shaped, although alternatives are possible. For example, the projections 75a, 75b may be symmetrical in other embodiments.

The first and second segments 60, 62 of the circumferential sealing rib 58 together define a controlled annular channel 78 for enclosing the sealant material 36 and providing a radial seal about the telecommunications cable 12 while maintain a low balanced pressure on the sealant material 36. The first and second projections 75a, 75b of the first and second segments 60, 62 of the circumferential sealing rib 58 are arranged and configured with a low pressure profile to embed into the sealant material 36 without puncturing or damaging the sealant material 36 when the first and second longitudinally extending pieces 42, 44 are mated together.

In certain examples, the first and second segments 60, 62 of the circumferential sealing rib 58 can each have a depth $d_1$ (e.g., height) (see FIG. 5) of about 2 mm to about 3 mm, although alternatives are possible. Typically, the depth $d_1$ of the first and second segments 60, 62 of the circumferential sealing rib 58 is about ½ as thick compared to the thickness of the sealant material 36 in order to provide the desired pressure on the telecommunications cable 12, although alternatives are possible. Usually, the depth $d_1$ of the first and second segments 60, 62 of the circumferential sealing rib 58 is about ¾ thick compared to the thickness of the sealant material 36, although alternatives are possible.

In other examples, the depth $d_1$ of the first and second segments 60, 62 of the circumferential sealing rib 58 can be about 20% of the sealant material 36 thickness, although alternatives are possible. Typically, the depth $d_1$ of the first and second segments 60, 62 of the circumferential sealing rib 58 is at least 30% of the thickness of the sealant material 36. Usually, the depth $d_1$ of the first and second segments 60, 62 of the circumferential sealing rib 58 is at least 40% of the thickness of the sealant material 36. Often, the depth $d_1$ of the first and second segments 60, 62 of the circumferential sealing rib 58 is at least 50% of the thickness of the sealant material 36. In certain examples, the depth $d_1$ of the first and second segments 60, 62 of the circumferential sealing rib 58 can range between 20% to 80% of the sealant material 36 thickness, although variations are possible. For example, the depth $d_1$ of the first and second segments 60, 62 of the circumferential sealing rib 58 can range between 30% to 70% of the sealant material 36 thickness.

Figure 7:
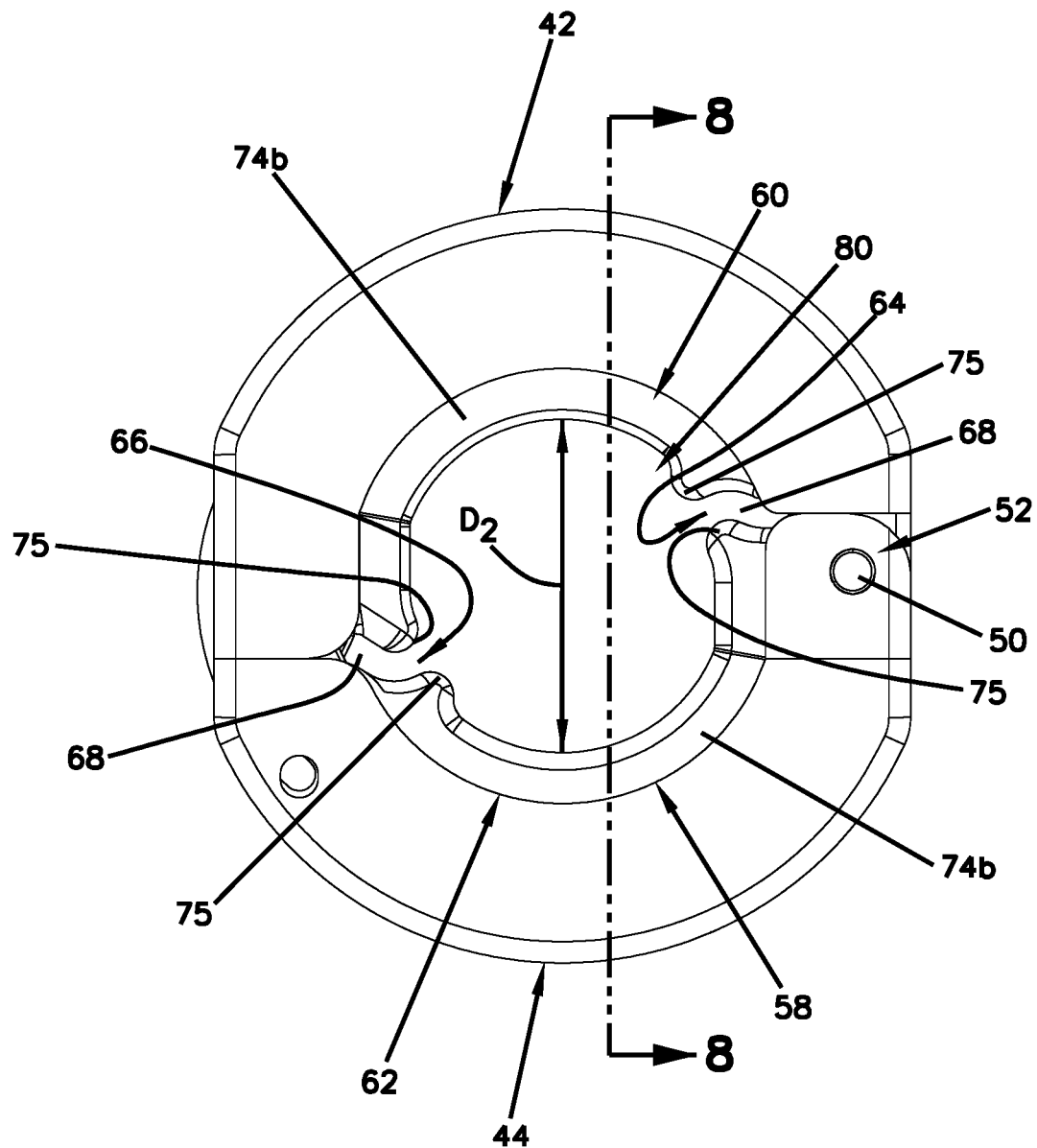
FIG. 7 is an end view of the housing shown in FIG. 4 depicting an opposite side thereof.
Figure 8:
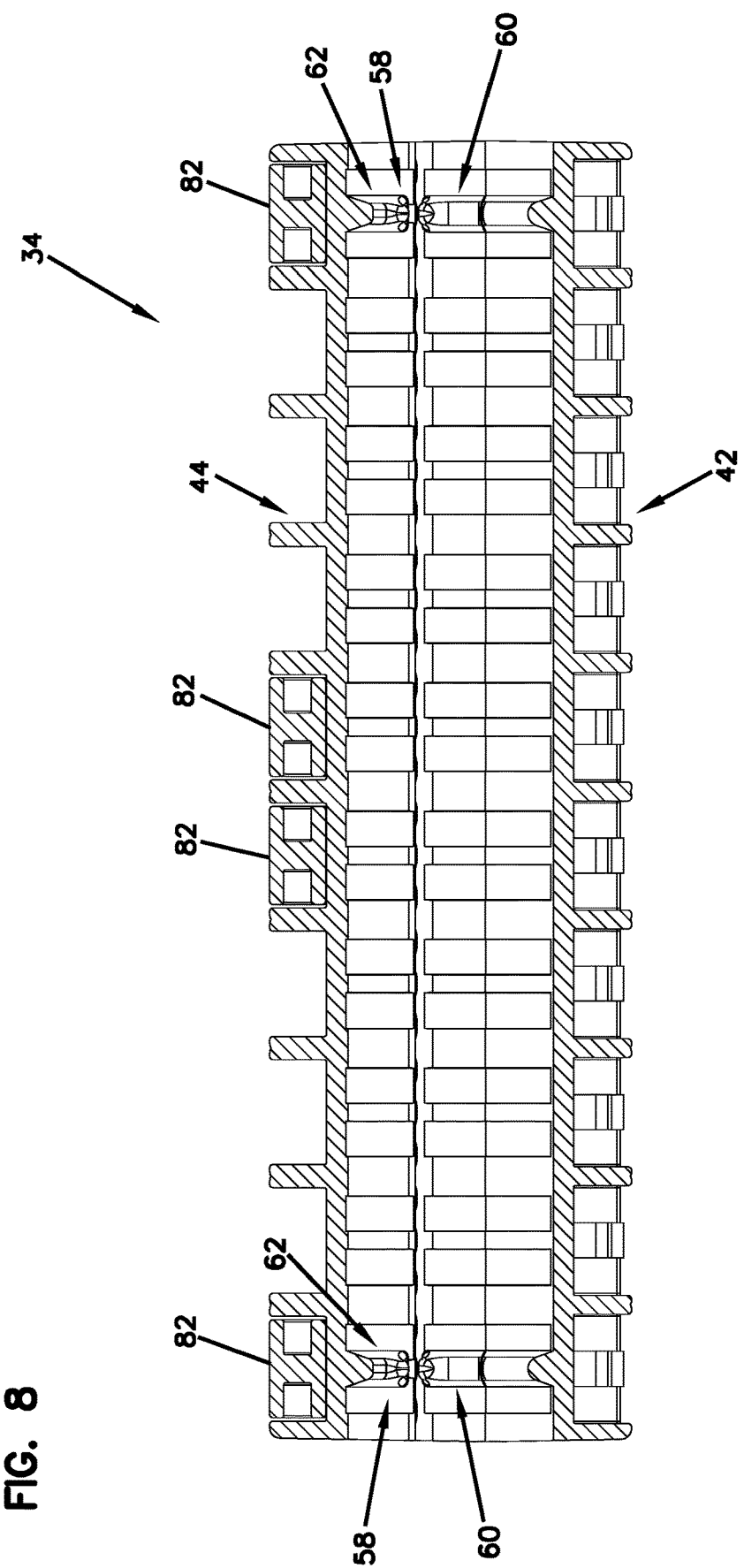
FIG. 8 is a cross-sectional view of the housing shown in FIG. 7 taken along line 8-8.

Referring to FIG. 7, the annular channel 78 defined by the first and second segments 60, 62 of the circumferential sealing rib 58 define annular openings 80 adjacent the first and second ends 38, 40 of the housing 34. The annular openings 80 can have a reduced second cross-dimension $D_2$ relative to the first cross-dimension $D_1$ of the recesses 48 of the housing 34. Referring to FIG. 8, a transverse cross-dimension of the circumferential sealing rib 58 depicts the circumferential sealing rib 58 having a round profile.

The housing 34 can include retention elements 82 (see FIG. 6) (e.g., clips, spring loaded clamps, latches, etc.) that mount on the outer wall surface 54 to secure the housing 34 to the telecommunications cable 12, although alternatives are possible. The retention elements 82 can be spaced apart about 5 cm along the housing 34 as needed. In the example depicted the retention elements 82 are shown mounted adjacent to both first and second ends 38, 40 of the housing 34 and also in the center thereof (see FIGS. 5 and 8).

Figure 9:
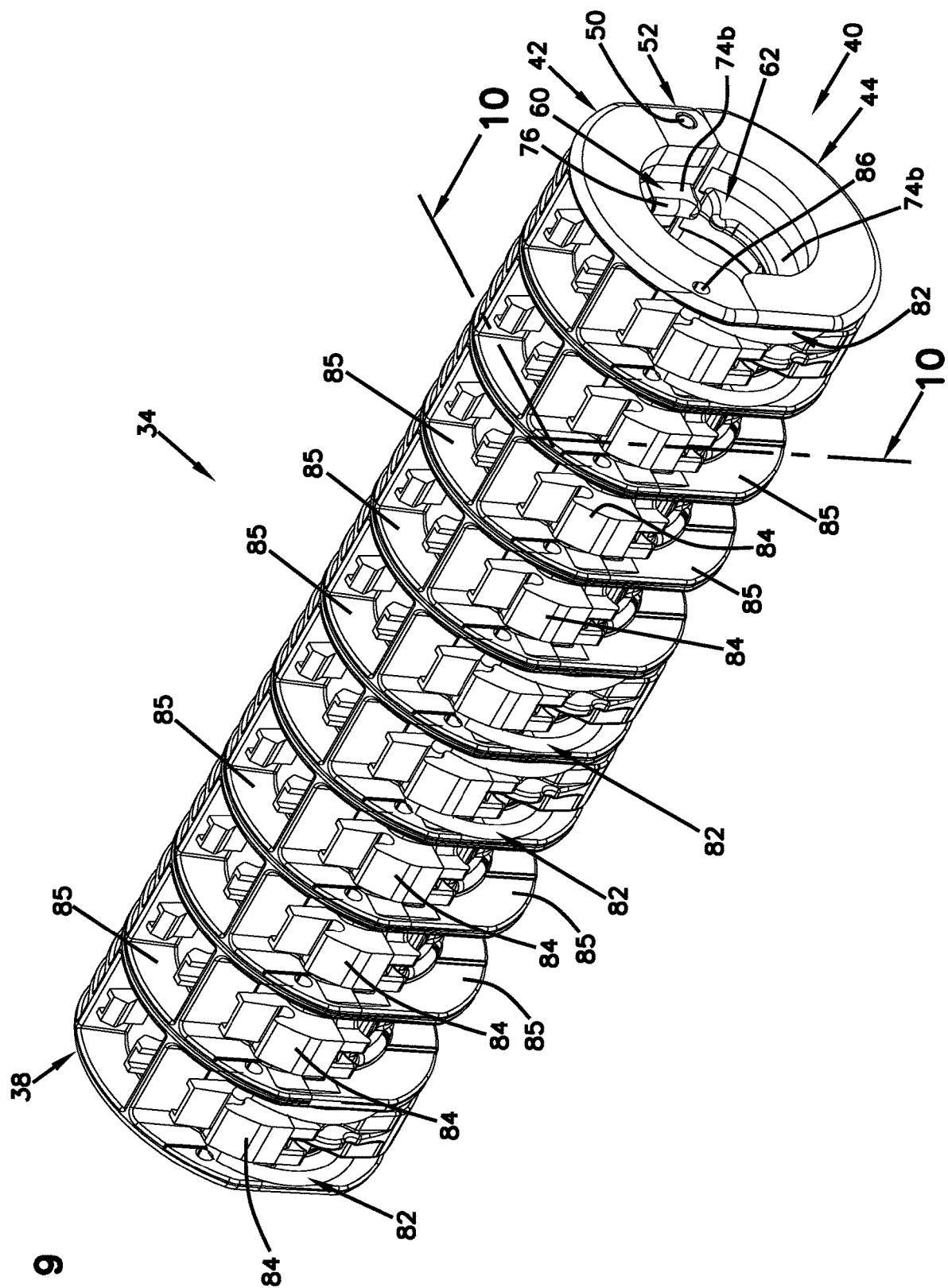
FIG. 9 is a perspective view of the housing shown in FIG. 3 depicting retention elements on the housing in accord with the principles of the present disclosure.
Figure 10:
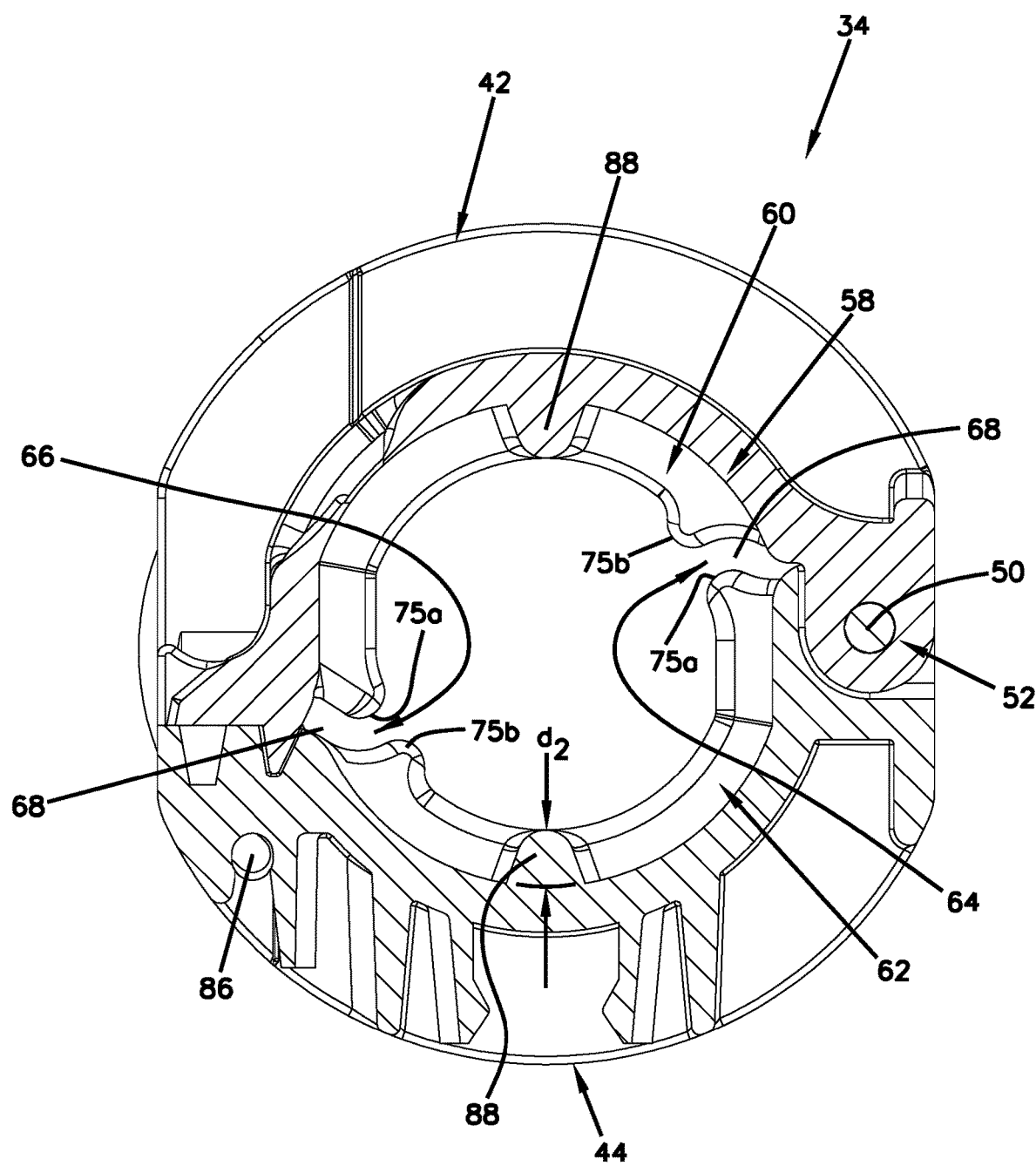
FIG. 10 is a cross-sectional view of the housing shown in FIG. 9 taken along line 10-10.

Referring to FIGS. 9 and 10, a perspective and cross-sectional view of the housing 34 is shown with the retention elements 82 mounted thereon. The housing 34 includes mounting elements 84 on the outer wall surface 54 for mounting the retention elements 82 thereon. The mounting elements 84 can be positioned between ribs 85 positioned on the outer wall surface 54 of the housing 34, although variations are possible. The retention elements 82 can be mounted using a metal spring 86 that extends longitudinally along the first longitudinally extending piece 42 of the housing 34, although alternatives are possible. As depicted, the retention elements 82 can be spaced along the housing 34 as desired such that not all of the mounting elements 84 will need to be utilized.

Turning again to FIG. 5, the housing 34 further includes a longitudinal sealing rib 88 positioned on the inner wall surface 56 of the first and second longitudinally extending pieces 42, 44. The longitudinal sealing ribs 88 can be arranged and configured to prevent water from migrating circumferentially (i.e., around the axis of the housing 34) between wrapped layers of the sealant material 36. The longitudinal sealing rib 88 can have a depth $d_2$ (e.g., height) (see FIG. 10) that extends from the inner wall surface 56 of the housing 34. The depth $d_2$ of the longitudinal sealing rib 88 can be about 20% of the sealant material 36 thickness, although alternatives are possible. Typically, the depth $d_2$ of the longitudinal sealing rib 88 is at least 30% of the thickness of the sealant material 36. Usually, the depth $d_2$ of the longitudinal sealing rib 88 is at least 40% of the thickness of the sealant material 36. Often, the depth $d_2$ of the longitudinal sealing rib 88 is at least 50% of the thickness of the sealant material 36. In certain examples, the depth $d_2$ of the longitudinal sealing rib 88 can range between 20% to 80% of the sealant material 36 thickness, although variations are possible. For example, the depth $d_2$ of the longitudinal sealing rib 88 can range between 30% to 70% of the sealant material 36 thickness.

The longitudinal sealing rib 88 of the first and second longitudinal extending pieces 42, 44 can extend axially from the circumferential sealing rib 58 adjacent the first end 38 of the housing 34 all the way to the circumferential sealing rib 58 adjacent the second end 40 of the housing 34 such that the longitudinal sealing rib 88 engages the circumferential sealing rib 58 at both first and second ends 38, 40, although alternatives are possible. For example, the longitudinal sealing rib 88 of the first and second longitudinal extending pieces 42, 44 can extend between the first and second ends 38, 40 of the housing 34.

Turning again to FIG. 10, a cross-sectional view of the housing 34 is depicted. The longitudinal sealing rib 88 of the first and second longitudinal extending pieces 42, 44 are shown having a round shape or profile in order to provide a longitudinal axial seal along the telecommunications cable 12 without puncturing or damaging the sealant material 36. The longitudinal sealing rib 88 can help to prevent leakage out of the housing 34. The longitudinal sealing rib 88 can have a curved or rounded shape to help provide a low balanced axial pressure without causing a puncture in the sealant material 36. The longitudinal sealing rib 88 can be in substantially parallel relation with the longitudinal axis X.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. An enclosure arrangement for sealing a telecommunications cable splice, the enclosure arrangement comprising:
a cylindrical housing having a first end and an opposite second end, the cylindrical housing including first and second longitudinally extending pieces that cooperate to define an optical cable passage that extends from the first end to the second end, the cylindrical housing defining a longitudinal axis that extends between the first and second ends; and
a circumferential sealing rib adjacent each of the first and second ends, the circumferential sealing rib including a first segment defined by the first longitudinally extending piece and a second segment defined by the second longitudinally extending piece;
wherein when the first and second longitudinally extending pieces are mated together, the first and second segments of each circumferential sealing rib oppose one another and are aligned in a single plane perpendicular to the longitudinal axis of the cylindrical housing, wherein the first and second segments of each circumferential sealing rib define first and second interface locations, and a contoured rounded gap is formed at the first and second interface locations between the first and second segments of the circumferential sealing rib, wherein the contoured rounded gap is configured for pressurizing and sealing without puncturing.

2. An enclosure arrangement according to claim 1, wherein the first and second longitudinally extending pieces are semi-cylindrical.

3. An enclosure arrangement according to claim 1, wherein projections are located at the interface locations defined by the first and second segments of the circumferential sealing rib, the projections having rounded surfaces that project outwardly into the optical cable passage.

4. An enclosure arrangement according to claim 3, wherein the first and second ends of the cylindrical housing each define recesses having a first cross-dimension for receiving an optical cable.

5. An enclosure arrangement according to claim 4, wherein each one of the first and second longitudinally extending pieces includes a longitudinal sealing rib that extends axially from the circumferential sealing rib adjacent the first end all the way to the circumferential sealing rib adjacent the second end.

6. An enclosure arrangement according to claim 5, wherein the longitudinal sealing rib is in substantially parallel relation with the longitudinal axis.

7. An enclosure arrangement according to claim 5, wherein the enclosure is configured to seal the optical cable, a portion of the optical cable being covered with a sealant material.

8. An enclosure arrangement according to claim 7, wherein the projections of the first and second segments of the circumferential sealing rib embed into the sealant material when the first and second longitudinally extending pieces are mated together.

9. An enclosure arrangement according to claim 7, wherein the longitudinal ribs of the first and second longitudinally extending pieces embed into the sealant material when mated together.

10. An enclosure arrangement according to claim 7, wherein the sealant material is a sealant sheet.

11. An enclosure arrangement according to claim 4, wherein the first and second segments of the circumferential sealing rib together define a controlled annular channel for enclosing a sealant material.

12. An enclosure arrangement according to claim 11, wherein the annular channel defines annular openings adjacent the first and second ends of the cylindrical housing, the annular openings having a reduced second cross-dimension relative to the first cross-dimension of the recesses of the cylindrical housing.

13. An enclosure arrangement according to claim 1, wherein in transverse cross-dimension, the circumferential sealing rib has a round profile.

14. An enclosure arrangement according to claim 1, wherein a hinge is attached between one side of each of the first and second longitudinally extending pieces.

15. An enclosure arrangement according to claim 1, wherein the first and second longitudinally extending pieces are connected by a clamp.

* * * * *